United States Patent Office 2,903,435
Patented Sept. 8, 1959

2,903,435

STABILIZED VEHICLES FOR RUST INHIBITIVE ALUMINUM COATINGS

Gordon M. Babcock, Plainfield, N.J., and Raymond H. Frederick and Francis B. Rethwisch, Louisville, Ky., assignors to Reynolds Metals Company, Richmond, Va., a corporation of Delaware No Drawing. Application October 31, 1955
Serial No. 544,053

8 Claims. (Cl. 260—21)

This invention relates to stabilized rust inhibitive aluminum coatings. We have found that improved rust inhibitive metallic coatings, in particular aluminum-strontium chromate pigmented coatings, can be obtained using vehicles which heretofore have not been suitable for this application. Such coatings may be characterized not only by persistency in leaf retention and color retention when mixed for long periods of time but also by more durable and harder setting paint films than those often encountered in ready-mixed aluminum paints. Such durable and harder setting paint films will produce the optimum conditions for making a combined prime coating and finish coating in one application.

Heretofore, when it has been desired to have aluminum-strontium chromate coatings premixed and ready to apply, vehicles which have been especially formulated for leaf-retention characteristics have been required. For this reason, ready-mixed aluminum-strontium chromate coatings have been made using softer setting type resins such as paracoumarone-indene and oils with low acid numbers, such as kettle bodied linseed, kettle bodied fish oil, etc. Although these coatings have been characterized by holding the leafing and color of the metallic pigment over a period of years, they have not given the hard drying, durable one-operation coating indicated as being most desirable for obtaining the maximum protection.

Tests of aluminum-strontium chromate pigmented coatings prepared using the hard setting resins such as alkyds, phenolics, melamines, or the like, have shown especially durable coatings giving the effect of a prime and finished coat in one operation. However, the use of alkyd, melamine, and other hard setting resins as vehicles with the leafing rust inhibitive aluminum pigment has been limited to those applications where it is possible to mix the required leafing aluminum pigment just prior to application. In mixes containing such resins, the aluminum pigment portion of the rust inhibitive paste usually loses its leafing power and the bright leafing aluminum color within a few hours' time after being mixed with the vehicle.

We have discovered a method of treating any such hard setting resin based vehicle without sacrifice of durability, appearance, hardness, drying time, or other undesirable change. The rust inhibitive aluminum paint made according to this new method will, similar to normal, ready-mixed, aluminum paints, be such as to allow packaging, warehousing, and shipping to the point of application. When ready to use, normal and usual stirring will be required to redisperse the pigment and thereby produce a full leafing, bright finish characteristic of good aluminum paints, which in one coat will produce the effect of both a prime and finish coat.

Alkyd, melamine, alkyd-melamine combinations, and the like, have been, until now, specifically mentioned as being unsuited for ready-mixed purposes by leading manufacturers of these products, by manufacturers of aluminium pigments, and by experts in the art of preparing leafing aluminum paints for ready-mixed packaging. Typical examples of these types of vehicles with descriptions thereof are listed below.

A. *Typical modified alkyd vehicle.*—Rezyl Resin Solution 412–1 manufactured by American Cyanamid Company.

Characteristics:
(a) Percent solids by weight, 50%
(b) Type solvent, mineral spirits
(c) Weight per gal., 7.8 pounds
(d) Analysis of solids—
  Phthalic anhydride, 30% minimum
  Soya fatty oil acids, 50% minimum
(e) Acid number based on solids, 3 to 8

B. *Alkyd resin solution.*—Rezyl Resin Solution 873–1 manufactured by American Cyanamid Company.

(1) Physical properties:
  Solids (percent by weight), 70–1
  Solvents, mineral spirits
  Viscosity (Gardner-Holdt, 25° C.), Z–1, Z–3
  Weight per gallon, 7.6 pounds
(2) Analysis of solid resin:
  Phthalic anhydride, 23% minimum
  Soya oil acids, 60% minimum
  Acid number, 4 to 8

C. *Melamine resin solution.*—Uformite MM–55 manufactured by Rohm & Haas Company.

(1) Uformite MM–55 is a melamine formaldehyde resin and as such contains formic acid. It must be plasticized with alkyd resins such as Rezyl 873–1 as illustrated above.
(2) Physical properties:
  Solids (percent by weight), 50
  Solvent, xylol and butanol (1:4)
  Weight per gallon, 8.1 pounds
  Viscosity (Gardner-Holdt, 25° C.), G–M
  Acid number solids resin, up to 2

D. *Styrenated alkyd.*—Styresol No. 4250–50 manufactured by Reichhold Chemical Company.

(1) An alkyd resin to which has been added the styrene polymer to achieve maximum durability, adhesion, hardness, gloss, fast dry and color retention.
(2) Physical properties:
  Solids (percent by weight), 49–51
  Volatile solvent, xylol
  Viscosity (Gardner-Holdt, 25° F.), S–U
  Weight per gallon, 8.00–8.09 pounds
  Acid number solids resin, 4 to 8

Leafing aluminum pigments, such as aluminum-strontium chromate paste, owe their ability to leaf or float to the surface in a properly prepared vehicle, to the oriented layer or layers of fatty materials deposited on the individual flake surfaces during manufacture. Saturated fatty acids, particularly myristic, palmitic, stearic acid, and the like, have been found best through long periods of usage. These acids show relatively weak acid action and low dissociation constants when compared with other types of acids usually associated with varnish and paint materials. Where acids with very high dissociation constants are present in a vehicle, the more active acids replace or wet the oriented molecules of the weaker fatty acids present on the leafing aluminum flakes. Examples of these acids are listed below:

| Acid | Formula | Constant for First Hydrogen | Temp., 0° C. | Constant for Second Hydrogen | Temp., 0° C. |
|---|---|---|---|---|---|
| Acetic | $C_2H_4O_2$ | $1.75 \times 10^{-5}$ | 25 | | |
| Formic | $CH_2O_2$ | $1.76 \times 10^{-4}$ | 25 | | |
| Maleic | $C_4H_4O_4$ | $1.5 \times 10^{-2}$ | 25 | $2.6 \times 10^{-7}$ | 25 |
| Malic | $C_4H_6O_5$ | $4.0 \times 10^{-4}$ | 25 | $9.0 \times 10^{-6}$ | 25 |
| Phthalic | $C_8H_6O_4$ | $1.26 \times 10^{-3}$ | 25 | $3.1 \times 10^{-6}$ | 25 |

This action reduces the interfacial tension between the surface of the aluminum pigment particles and the vehicle, allowing the particles to be "wetted" by the vehicle. This causes loss of the floating or leafing property of the pigment and destroys the pleasing silvery appearance normally associated with good aluminum paint application. The time required to destroy the leafing property of the aluminum flake pigments depends on the amount of acid and on the dissociation constant of the destructive acid or acids in the vehicle. This time may vary from a few minutes to a few days. Heat and agitation will also accelerate this phenomenon.

We have discovered that it is possible to prevent the destructive effects of these stronger, leaf destroying acids by replacing them, without affecting the physical characteristics of the applied paint or coating after application, and also to extend for longer periods of time the leafing characteristics of the leafing aluminum pigments portion of the aluminum strontium chromate paste mixed with the vehicles. We employ a replacement agent in the form of an addition product obtained by the action of certain basic organic compounds with saturated fatty acids of the stearic-palmitic series, preferably having a carbon content of at least 12. The basic organic compound as well as the addition product must be soluble and compatible in the usual paint and varnish thinners. For practical purposes, this basic organic compound must be stable, freely available at reasonable cost, low in toxicity and low in inflammability.

It has been found that many of the commercial grades of amines, now on the market, are quite suitable for use as the basic organic compound. In addition to these specific amines, other similar compounds, such as amidenes, or even soaps of ammonia, e.g., dry, moisture-free ammonium stearate, may be used.

To prepare our replacement agent, chemically equivalent amounts of the fatty acid and the basic organic compound are dissolved in a thinner compatible with the paint vehicle to which it is to be added. Varnolene (a petroleum liquid well known as mineral spirits in the paint trade), xylol, toluol, etc., are suitable. The reagents may be dissolved separately and then combined, or they may be dissolved simultaneously. Heating will effect faster solution and reaction but is not necessary. Slight excess amounts above the stoichiometric equivalent of the fatty acid may be allowed but proportions of the basic organic compound should not exceed the chemical equivalency.

General chemical equations illustrating the formation of the addition product in the replacement solution, when the basic organic compound is an amine, would be:

$$RNH_2 + HOOCR' \rightarrow RNH_2 \cdot HOOCR'$$
$$R_2NH + HOOCR' \rightarrow R_2NH \cdot HOOCR'$$

where

R is an organic radical
R' is a long-chain alkyl radical

The chemical equation illustrating the formation of the addition product solution when using dibutyl amine $(C_4H_9)_2NH$, as the basic organic compound and stearic acid, $HOOCH_{35}C_{17}$, is given below:

$$(C_4H_9)_2NH + HOOCH_{35}C_{17} \rightarrow (C_4H_9)_2NH \cdot HOOCH_{35}C_{17}$$

The replacement agent, compounded as above, may be added at any point in the mixing of the aluminum-strontium chromate pigment and the vehicle to be treated. If desired, it may be added to the stable leafing aluminum-strontium chromate pigment. A preferred method is to add the required amount to the vehicle itself before the leafing aluminum-strontium chromate paste is added. Since the coating composition may be treated at any of the stages of manufacture, typical formulae will be given for the compositions of these various components.

Our replacement agent may be effectively employed with many types of vehicles, such as alkyds (including modified alkyds, phthalic alkyds, maleic alkyds, styrenated alkyds, and the like), urea resins, melamines, and any resinous or oleo-resinous combinations containing what we have designated as strong or active acids.

The amount of replacement agent solution required to treat a specific vehicle will depend on the amount of free acid present in the vehicle. This can easily be determined by methods well known to those skilled in the art. The amount required for the minimum effect would then be that quantity containing the chemical equivalent of the free acid present in the vehicle.

Thus, for a vehicle containing free acid (phthalic, maleic, or like type) and showing an acid number of 7.58 by A.S.T.M. method D154–50, the minimum amount of the replacement agent to be used (if the latter showed a potential basic activity or potential replacement number, as defined below, of 56.1) would be 13.53 grams of the agent to 100 grams of vehicle. As a convenient method of calculation to obtain the minimum amount of potential neutralizer required for 100 grams of vehicle, the following formulae are indicated:

Potential replacement number (mg. per gm. of solution) = 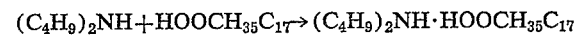

$$= \frac{56{,}100 \text{ times concentration by weight of basic organic compound in decimal percent in the solution}}{\text{Molecular weight of basic organic compound}}$$

Theoretical minimum amount of replacement agent (expressed in grams) to be added to 100 gms. of vehicle $= \dfrac{\text{Acid number of vehicle}}{\text{Potential replacement number}} + 100$ It is pointed out that while complete replacement of the high dissociation constant acids in the vehicle by our agent will give optimum results, we do not limit our invention to this total replacement, as it is possible to prepare suitable paints with acceptable ready mixed leafing life by only partly diminishing the amount of harmful free acid in the vehicle. By this method, the speed of destroying the leafing effect by the harmful acids is greatly diminished.

It is believed that the action of the replacement agent upon the free high dissociation constant acid in the vehicle is as outlined below. The reaction product of the saturated fatty acid and the basic organic compound results in a new compound in the form of an addition product. Because of the relatively weak and low dissociation constant of the fatty acid component of this addition product, it is easily replaced by the stronger, high dissociation constant free acid in the vehicle, releasing the weaker, less harmful acid in the vehicle.

A general chemical equation for the reaction taking place in a vehicle treated with the replacement agent solution would be:

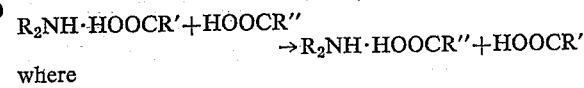

$$R_2NH \cdot HOOCR' + HOOCR'' \rightarrow R_2NH \cdot HOOCR'' + HOOCR'$$

where

R is the organic radical in the basic organic compound, R' is the organic radical in the fatty acid, and R'' is the organic radical in the destructive acid present in the vehicle.

A chemical equation for the reaction taking place when a vehicle containing free maleic acid is treated with the replacement agent solution prepared from dibutyl amine and stearic acid would be:

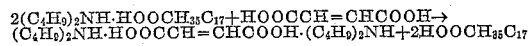

and in a vehicle containing free phthalic acid $$C_6H_4(COOH)_2$$

and in a vehicle containing free phthalic acid and free formic acid, HCOOH:

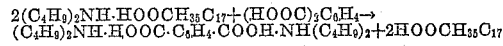

This action is illustrated in Table 1, in which the replacement agent was prepared using the following proportions:

|  | Grams |
|---|---|
| Dibutyl amine | 12.9 |
| Stearic acid | 28.45 |
| Mineral spirits | 58.65 |
|  | 100.00 |

Potential neutralizing number, 56.1.

TABLE 1

|  | Percent Solids | Acid No. of Vehicle | Potential Replacement No. | Amount of Replacement Agent Used | Apparent Acid No. of Treated Vehicle |
|---|---|---|---|---|---|
| Styrenated Alkyd | 50 | 4.4 | 56.1 | 3.9 | 5.1 |
| Alkyd-Melamine | 50 | 5.8 | 56.1 | 5.4 | 8.1 |

It is shown in Table 1 that the free harmful acid in the vehicles has not been saponified by the potential neutralizer but has simply replaced the weaker acid in the potential neutralizer, thus releasing the weaker acid in the vehicle accounting for the higher apparent acid number of the treated vehicle. The action of the replacement agent solution of Table 1 on specific vehicles discussed herein is illustrated by Table 2 below.

TABLE 2

| Vehicle | Amount of Replacement Agent Sol., Gr./100 Gr. | Initial | Leafing on Accelerated Stability Test in oven at 105° C. Measured in Creep, mm.[1] | | | | | |
|---|---|---|---|---|---|---|---|---|
|  |  |  | No. of Hours | | | | | |
|  |  |  | 17 | 33 | 73 | 139 | 251 | 389 |
| Styrenated Alkyd pigmented 2½ pounds per gal. with aluminum-strontium chromate paste composition Reynolds No. 7391[2] | | | | | | | | |
| (a) Untreated | None | 35 | 35 | 29 | 25 | 10 | 10 | None |
| (b) Treated as (1)[3] | 3.9 | 35 | 33 | 34 | 33 | 32 | 35 | 33 |
| (c) Treated as (2)[4] | 7.8 | 30 | 30 | 30 | 28 | 28 | 29 | 30 |
| Alkyd Melamine pigmented 2½ pounds per gal. with aluminum-strontium chromate paste composition Reynolds No. 7391 | | | | | | | | |
| (a) Untreated | None | 42 | 5 | None | None | None | None | None |
| (b) Treated as (1)[3] | 5.4 | 35 | 35 | 33 | 30 | 15 | 12 | 5 |
| (c) Treated as (2)[4] | 10.8 | 35 | 35 | 34 | 33 | 30 | 28 | 22 |

[1] Experience has shown that 100 hours of accelerated treatment can be considered the equivalent of three months normal package stability.
[2] A composition of this paste is indicated in U.S. Patent No. 2,701,772.
[3] (1) Vehicle treated with stoichiometric amount of solution.
[4] (2) Vehicle treated with double the stoichiometric amount of solution.

As shown in Table 2, the styrenated alkyd treated with the stoichiometric amount of replacement agent solution and pigmented with the rust inhibitive aluminum paste has retained its leafing much longer than the untreated vehicle on the accelerated stability test, and brushouts show a bright leafing aluminum finish. This is also true as shown in the second part of Table 2 in the case of the alkyd melamine. However, in this case, double the stoichiometric amount of solution has performed more effectively since the alkyd melamine contains both phthalic and formic acids, whereas the styrenated alkyd contains only phthalic acid and in lesser amounts.

Examples (a) Prepared stabilizing agents for use with various types of vehicles:

1. Dibutylamine _____ grams__ 12.9
   Stearic acid _____ do____ 28.45
   Mineral spirits _____ do____ 58.65
   Potential replacement number or potential neutralizing number _____ 56.1
2. Octadecylamine _____ grams__ 26.95
   Stearic acid _____ do____ 28.45
   Mineral spirits _____ do____ 44.60
   Potential replacement number or potential neutralizing number _____ 56.1
3. Methylamine _____ grams__ 3.10
   Stearic acid _____ do____ 28.56
   Mineral spirits _____ do____ 68.45
   Potential replacement number or potential neutralizing number _____ 56.1

Should it be desired to incorporate the replacement agent with the leafing aluminum-strontium chromate pigment, the following is given as an example of a composition to be used at 2.5 pounds per gallon of a vehicle showing an acid number of not greater than 8.0.

|  | Lbs. |
|---|---|
| 4. Leafing aluminum pigment | 65 |
| Strontium chromate | 65 |
| Replacement agent (Example (a) (1)) | 15.4 |
| Mineral spirits | 34.6 |
|  | 180.0 |

(c) Ready-mixed aluminum-strontium chromate paint:

| | Lbs. |
|---|---|
| 5. Leafing aluminum pigment | 1.0 |
| Strontium chromate pigment | 1.0 |
| Rezyl 412–1 solution | 5.8 |
| Mineral spirits | 1.0 |
| Replacement agent (Example (a)(1)) | 0.35 |
| | 9.15 |

| | Lbs. |
|---|---|
| 6. Leafing aluminum pigment | 1.0 |
| Strontium chromate pigment | 0.25 |
| Styresol #4250 | 4.80 |
| Aromatic solvent | 2.50 |
| Replacement agent (Example (a)(1)) | 0.35 |
| | 8.90 |

(d) Vehicle:

| | Lbs. |
|---|---|
| 7. Rezyl 412–1 solution | 5.8 |
| Replacement agent (Example (a)(1)) | 0.35 |
| | 6.15 |

Although the present invention has been described with reference to certain particular compositions, it is not limited to these, and other similar compositions are within its scope.

What is claimed is:

1. A film-forming hard synthetic resin composition comprising a leafing aluminum-strontium chromate pigment and a hydrocarbon thinner for said vehicle, said synthetic resin being selected from the class consisting of aykyd resins having an acid number of less than about 8, a styrenated alkyd resin having an acid number of less than about 8, urea-formaldehyde resins containing acid, melamine aldehyde resins containing acid and mixtures of said alkyd resins with melamine-aldehyde resins and with urea-formaldehyde resins, there being present in said composition an amount of acid as will reduce the interfacial tension between the surface of the leafing aluminum pigment particles to wet said pigment particles with said resin and thereby prevent flotation of said particles in the film and impair the silvery appearance of the aluminum pigmented film, said acid having a dissociation constant for the first hydrogen of at least about $1.75 \times 10^{-5}$, and a stabilizing agent soluble in said organic thinner which retards the leaf impairing characteristics of said acid in said composition for said leafing aluminum pigment, said stabilizing agent consisting of the addition salt product of a saturated fatty acid having at least 12 carbon atoms and an amine of the formula $R_1$—$NHR_2$ where $R_1$ is an alkyl radical and $R_2$ is a radical selected from the group consisting of alkyl and hydrogen, the amount of said addition salt being from about 3.9% to about 10.8% of the weight of combined leafing aluminum-strontium chromate pigment and synthetic resin.

2. A film-forming hard synthetic resin composition comprising a leafing aluminum-strontium chromate pigment and a hydrocarbon thinner for said vehicle, said synthetic resin being selected from the class consisting of alkyd resins having an acid number of less than about 8, a styrenated alkyd resin having an acid number of less than about 8, urea-formaldehyde resins containing acid, melamine aldehyde resins containing acid and mixtures of said alkyd resins with melamine-aldehyde resins and with urea-formaldehyde resins, there being present in said composition an amount of acid as will reduce the interfacial tension between the surface of the leafing aluminum pigment particles to wet said pigment particles with said resin and thereby prevent flotation of said particles in the film and impair the silvery appearance of aluminum pigmented film, said acid having a dissociation constant for the first hydrogen of at least about $1.75 \times 10^{-5}$, and being a member of the group consisting of acetic acid, formic acid, maleic acid, malic acid and phthalic acid, and a stabilizing agent soluble in said organic thinner which retards the leaf impairing characteristics of said acid in said composition for said leafing aluminum pigment, said stabilizing agent consisting of the addition salt product of a saturated fatty acid having at least 12 carbon atoms and an amine of the formula $R_1$—$NHR_2$ where $R_1$ is an alkyl radical and $R_2$ is a radical selected from the group consisting of alkyl and hydrogen, the among of said addition salt being from about 3.9 to about 10.8% of the weight of combined leafing aluminum-strontium chromate pigment and synthetic resin.

3. A film-forming hard synthetic resin composition comprising a leafing aluminum-strontium chromate pigment and a hydrocarbon thinner for said vehicle, said synthetic resin being selected from the class consisting of alkyd resins having an acid number of less than about 8, a styrenated alkyd resin having an acid number of less than about 8, urea-formaldehyde resins containing acid, melamine aldehyde resins containing acid and mixtures of said alkyd resins with melamine-aldehyde resins and with urea-formaldehyde resins, there being present in said composition an amount of acid as will reduce the interfacial tension between the surface of the leafing aluminum pigment particles to wet said pigment particles with said resin and thereby prevent flotation of said particles in the film and impair the silvery appearance of the aluminum pigmented film, said acid having a dissociation constant for the first hydrogen of at least about $1.75 \times 10^{-5}$, and a stabilizing agent soluble in said organic thinner which retards the leaf impairing characteristics of said acid in said composition for said leafing aluminum pigment, said stabilizing agent consisting of the addition salt product of stearic acid and dibutyl amine, the amount of said addition salt being from about 3.9% to about 10.8% of the weight of combined leafing aluminum-strontium chromate pigment and synthetic resin.

4. A film-forming hard synthetic resin composition comprising a leafing aluminum-strontium chromate pigment and a hydrocarbon thinner for said vehicle, said synthetic resin being selected from the class consisting of alkyd resins having an acid number of less than about 8, a styrenated alkyd resin having an acid number of less than about 8, urea-formaldehyde resins containing acid, melamine aldehyde resins containing acid and mixtures of said alkyd resins with melamine-aldehyde resins and with urea-formaldehyde resins, there being present in said composition an amount of acid as will reduce the interfacial tension between the surface of the leafing aluminum pigment particles to wet said pigment particles with said resin and thereby prevent flotation of said particles in the film and impair the silvery appearance of the aluminum pigmented film, said acid having a dissociation constant for the first hydrogen of at least about $1.75 \times 10^{-5}$, and a stabilizing agent soluble in said organic thinner which retards the leaf impairing characteristics of said acid in said composition for said leafing aluminum pigment, said stabilizing agent consisting of the addition salt product of myristic acid and dibutyl amine, the amount of said addition salt being from about 3.9% to about 10.8% of the weight of combined leafing aluminum-strontium chromate pigment and synthetic resin.

5. A film-forming hard synthetic resin composition comprising a leafing aluminum-strontium chromate pigment and a hydrocarbon thinner for said vehicle, said synthetic resin being selected from the class consisting of alkyd resins having an acid number of less than about 8, a styrenated alkyd resin having an acid number of less than about 8, urea-formaldehyde resins containing acid, melamine aldehyde resins containing acid and mixtures of said alkyd resins with melamine-aldehyde resins and with urea-formaldehyde resins, there being present in said composition an amount of acid as will reduce the interfacial tension between the surface of the leafing aluminum pigment particles to wet said pigment particles with said resin and thereby prevent flotation of said particles in the film and impair the silvery appearance of the aluminum pigmented film, said acid having a dissocation constant for the first hydrogen of at least about $1.75 \times 10^{-5}$, and a stabilizing agent soluble in said organic thinner which retards the leaf impairing characteristics of said acid in said composition for said leafing aluminum pigment, said stabilizing agent consisting of the addition salt product of palmitic acid and dibutyl amine, the amount of said addition salt being from about 3.9% to about 10.8% of the weight of combined leafing aluminum-strontium chromate pigment and synthetic resin.

6. A film-forming hard synthetic resin composition comprising a leafing aluminum-strontium chromate pigment and a hydrocarbon thinner for said vehicle, said synthetic resin being a mixture of alkyd resin having an acid number of less than about 8 and melamine-formaldehyde resin, there being present in said composition an amount of acid as will reduce the interfacial tension between the surface of the leafing aluminum pigment particles to wet said pigment particles with said resin and thereby prevent flotation of said particles in the film and impair the silvery appearance of the aluminum pigmented film, said acid having a dissociation constant for the first hydrogen of at least about $1.75 \times 10^{-5}$, and a stabilizing agent soluble in said organic thinner which retards the leaf impairing characteristics of said acid in said composition for said leafing aluminum pigment, said stabilizing agent consisting of the addition salt product of a saturated fatty acid having at least 12 carbon atoms and an amine of the formula $R_1$—$NHR_2$ where $R_1$ is an alkyl radical and $R_2$ is a radical selected from the group consisting of alkyl and hydrogen, the amount of said addition salt being from about 3.9% to about 10.8% of the weight of combined leafing aluminum-strontium chromate pigment and synthetic resin.

7. A film-forming hard synthetic resin composition comprising a leafing aluminum-strontium chromate pigment and a hydrocarbon thinner for said vehicle, said thinner containing an aromatic hydrocarbon, and said synthetic resin being selected from the class consisting of alkyd resins having an acid number of less than about 8, a styrenated alkyd resin having an acid number of less than about 8, urea-formaldehyde resins containing acid, melamine aldehyde resins containing acid and mixtures of said alkyd resins with melamine-aldehyde resins and with urea-formaldehyde resins, there being present in said composition an amount of acid as will reduce the interfacial tension between the surface of the leafing aluminum pigment particles to wet said pigment particles with said resin and thereby prevent flotation of said particles in the film and impair the silvery appearance of the aluminum pigmented film, said acid having a dissocation constant for the first hydrogen of at least about $1.75 \times 10^{-5}$, and a stabilizing agent soluble in said organic thinner which retards the leaf impairing characteristics of said acid in said composition for said leafing aluminum pigment, said stabilizing agent consisting of the addition salt product of a saturated fatty acid having at least 12 carbon atoms and an amine of the formula $R_1$—$NHR_2$ where $R_1$ is an alkyl radical and $R_2$ is a radical selected from the group consisting of alkyl and hydrogen, the amount of said addition salt being from about 3.9% to about 10.8% of the weight of combined leafing aluminum-strontium chromate pigment and synthetic resin.

8. A film-forming hard synthetic resin composition comprising a leafing aluminum-strontium chromate pigment and a hydrocarbon thinner for said vehicle, said thinner containing an aliphatic hydrocarbon, and said synthetic resin being selected from the class consisting of alkyd resins having an acid number of less than about 8, a styrenated alkyd resin having an acid number of less than about 8, urea-formaldehyde resins containing acid, melamine aldehyde resins containing acid and mixtures of said alkyd resins with melamine-aldehyde resins and with urea-formaldehyde resins, there being present in said composition an amount of acid as will reduce the interfacial tension between the surface of the leafing aluminum pigment particles to wet said pigment particles with said resin and thereby prevent flotation of said particles in the film and impair the silvery appearance of the aluminum pigmented film, said acid having a dissociation constant for the first hydrogen of at least about $1.75 \times 10^{-5}$, and a stabilizing agent soluble in said organic thinner which retards the leaf impairing characteristics of said acid in said composition for said leafing aluminum pigment, said stabilizing agent consisting of the addition salt product of a saturated fatty acid having at least 12 carbon atoms and an amine of the formula $R_1$—$NHR_2$ where $R_1$ is an alkyl radical and $R_2$ is a radical selected from the group consisting of alkyl and hydrogen, the amount of said addition salt being from about 3.9% to about 10.8% of the weight of combined leafing aluminum-strontium chromate pigment and synthetic resin.

References Cited in the file of this patent

UNITED STATES PATENTS

| | | |
|---|---|---|
| 1,848,213 | Wiegand | Mar. 8, 1932 |
| 2,178,018 | Hofmann | Oct. 31, 1939 |
| 2,178,181 | McMahan | Oct. 31, 1939 |
| 2,234,164 | Harris | Mar. 11, 1941 |
| 2,267,240 | Kummel | Dec. 23, 1941 |
| 2,474,520 | Fleming | June 28, 1949 |
| 2,587,267 | Wray | Feb. 26, 1952 |
| 2,587,268 | Roberts | Feb. 26, 1952 |
| 2,635,057 | Jordan | Apr. 14, 1953 |
| 2,662,027 | Pike | Dec. 8, 1953 |
| 2,701,772 | Babcock | Feb. 8, 1955 |

OTHER REFERENCES

Hoenel: Paint, Oil and Chem. Rev., pp. 19–26, July 4, 1931.

Edwards: Aluminum Paint and Powder, page 46–62, Reinhold Pub. Corp. (1936). (Copy in S.L. Div. 56.)